United States Patent [19]

Morishita et al.

[11] Patent Number: 4,666,010

[45] Date of Patent: May 19, 1987

[54] POWER STEERING APPARATUS

[75] Inventors: Mitsuharu Morishita; Tadayuki Hara; Shinichi Kohge; Tetsushi Watanabe, all of Himeji; Yasuki Ikari, Hiroshima, all of Japan

[73] Assignee: Mitsubishi Denki Kabushiki Kaisha, Tokyo, Japan

[21] Appl. No.: 772,676

[22] Filed: Sep. 5, 1985

[30] Foreign Application Priority Data

Sep. 5, 1984 [JP] Japan .................. 59-135011

[51] Int. Cl.⁴ .............................................. B62D 5/04
[52] U.S. Cl. ................................................... 180/79.1
[58] Field of Search .............................. 180/79.1, 142; 74/388 PS

[56] References Cited

U.S. PATENT DOCUMENTS

| 1,144,552 | 6/1915 | Lardner et al. | 180/79.1 X |
| 1,948,487 | 2/1934 | Berry | 180/79.1 |
| 2,761,326 | 9/1956 | Herbenar et al. | 180/79.1 X |
| 2,806,101 | 9/1957 | Gardes | 180/79.1 X |
| 2,820,872 | 1/1958 | Carr | 180/79.1 X |

FOREIGN PATENT DOCUMENTS

| 55-44013 | 3/1980 | Japan . |
| 57-120164 | 7/1982 | Japan . |
| 59-9973 | 1/1984 | Japan . |

Primary Examiner—John A. Pekar
Attorney, Agent, or Firm—Wenderoth, Lind & Ponack

[57] ABSTRACT

A power steering apparatus for an automobile or other vehicle has a motor which rotates a steering shaft through an electromagnetic clutch and a worm gear reduction gear. When the clutch is engaged, the rotation of the motor causes the rotation of the steering shaft. When the clutch is disengaged, the steering shaft is not connected to either the reduction gear or the motor and can therefore be rotated manually with the same force as for a manual steering apparatus. The reduction gear and the electromagnetic clutch are coaxially disposed around the steering shaft.

6 Claims, 4 Drawing Figures

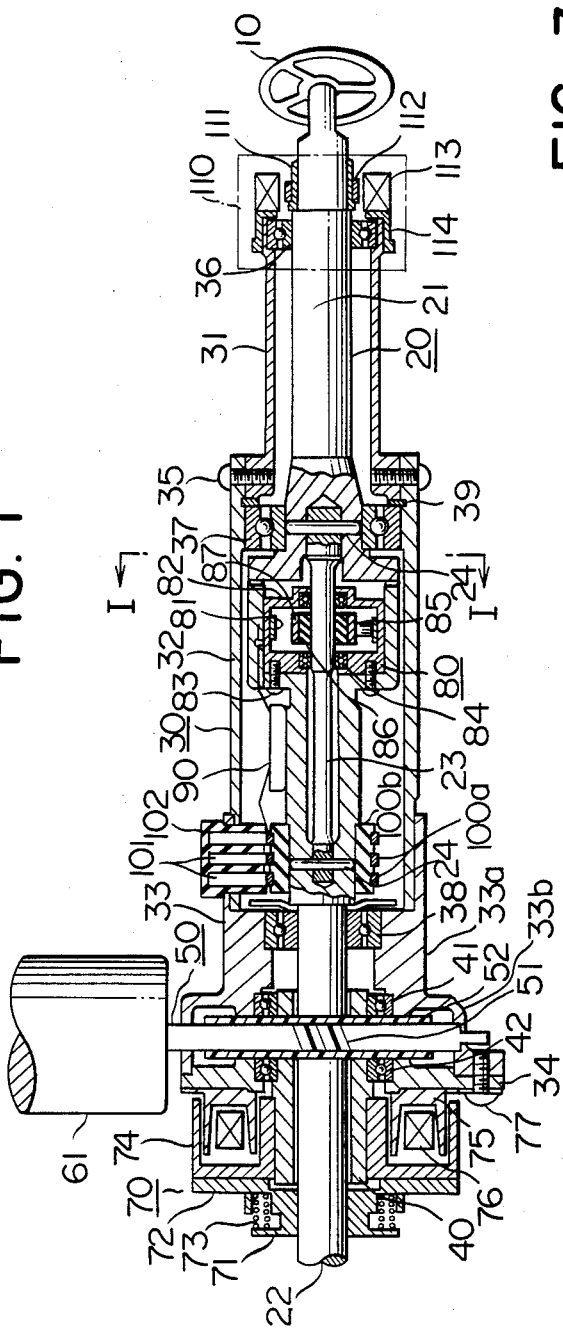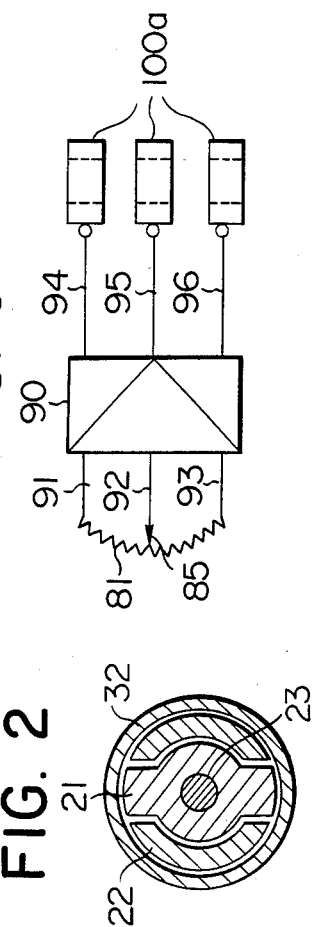

POWER STEERING APPARATUS

BACKGROUND OF THE INVENTION

This invention relates to a power steering apparatus for an automobile or other vehicle in which the force required to turn the steering wheel of the vehicle is lessened by the operation of an electric motor.

In a power steering apparatus for an automobile, when the driver applies torque to the steering wheel of the automobile, the steering shaft is caused to undergo an initial slight rotation. The rotation is detected by a rotation detecting mechanism, and a motor is energized in response to this initial rotation to rotate the steering shaft and decrease the force which must be exerted by the driver.

Various arrangements have been proposed for connecting a motor to a steering shaft so as to rotate the steering shaft when the motor is operated. In one type of conventional apparatus, a motor for providing power to a steering shaft drives a reduction gear through a clutch. The output shaft of the reduction gear has a pulley mounted thereon, and rotational force is transmitted from this pulley to another pulley mounted on the steering shaft via a V-belt.

With such a structure, the power steering mechanism becomes extremely bulky, since the reduction gear, the clutch, and the motor are all separate units independent of the steering shaft. Furthermore, although the motor can be disconnected from the reduction gear via the clutch, the steering shaft is at all times connected to the reduction gear by the V-belt and the pulleys. Accordingly, if the motor fails and the steering shaft must be rotated manually by the driver, the driver must exert a force sufficient not only to turn the wheels of the vehicle but also to overcome the resistance of the reduction gear which turns with the steering shaft. Therefore, steering becomes difficult.

According to another arrangement, a motor for decreasing the steering force is connected not to the steering shaft but to the steering gear rack of the vehicle. For example, in Japanese Laid Open Utility Model Application No. 57-120164, a steering shaft and a motor are drivingly connected to a steering gear rack by separate pinions. When either the motor or the steering shaft is rotated, the pinions rotate, causing the steering gear rack to translate, thereby changing the direction in which the wheels of the vehicle point. However, no clutch is provided between the motor and the steering gear rack, with the result that when the motor fails and it is necessary for the driver to move the steering gear rack manually, the driver must apply enough force not only to move the steering gear rack but also to rotate the motor Accordingly, this arrangement, too, has the disadvantage that steering becomes difficult.

SUMMARY OF THE INVENTION

It is an object of the present invention to provide a power steering apparatus for an automobile or other vehicle which in the event of failure of a motor can be steered manually with no more force than is required for steering a vehicle by conventional manual steering.

It is another object of the present invention to provide a power steering apparatus which has a compact structure and which is light in weight.

In a power steering apparatus according to the present invention, rotational force is transmitted from an electric motor to a steering shaft via an electromagnetic clutch and a worm gear reduction gear. When the clutch is disengaged, the steering shaft can rotate independently of both the reduction gear and the motor. Accordingly, when the motor is not operated and steering is performed manually, the steering wheel, can be turned with no more force than is required for the conventional manual steering apparatus. The clutch and the reduction gear are coaxially disposed with respect to the steering shaft and a worm gear is used as the reduction gear so that the apparatus is compact.

BRIEF DESCRIPTION OF THE DRAWINGS

FIG. 1 is a longitudinal cross-sectional view of a portion of an embodiment of a power steering apparatus according to the present invention.

FIG. 2 is a cross-sectional view of the embodiment of FIG. 1 taken along Line I—I of FIG. 1.

FIG. 3 is a schematic view of the connection between the preamplifier and the potentiometer of FIG. 1.

In the figures, the same reference numerals indicate the same or corresponding parts.

DESCRIPTION OF THE PREFERRED EMBODIMENT

Figure 4:
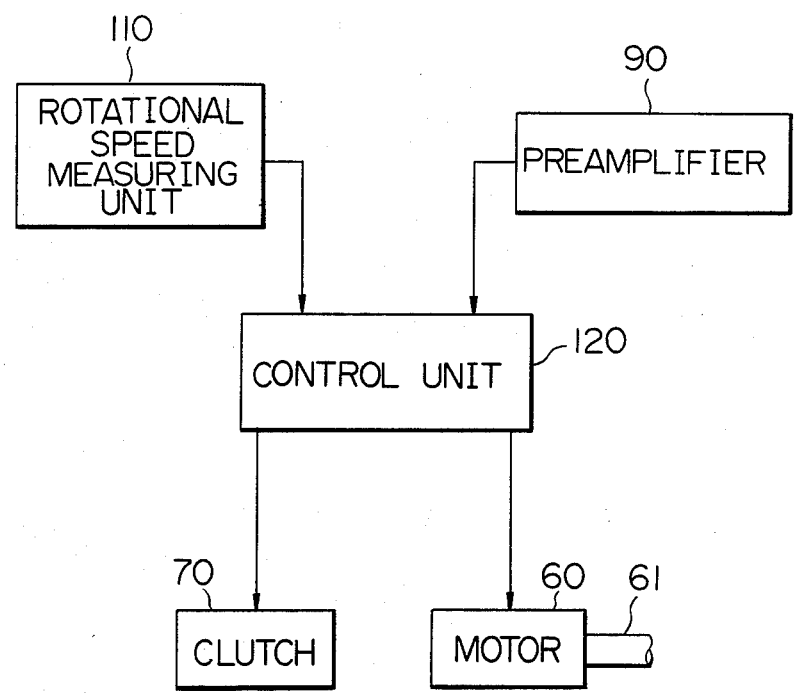
FIG. 4 is a block diagram illustrating the control unit for controlling the operation of the motor of the apparatus.

An embodiment of a power steering apparatus according to the present invention will now be described with reference to the accompanying drawings. As shown in FIG. 1, which is a longitudinal cross-sectional view of this embodiment, a steering wheel 10 is secured to one end of a rotatably supported steering shaft 20, the steering shaft 20 comprising an input section 21, an output section 22, and a torsion bar 23. The input section 21 and the output section 22 are connected with one another by the torsion bar 23, which is connected at its ends to the input section 21 and the output section 22 by pins 24, although splines or other means may be used instead. The input section 21 and the output section 22 both have hollow centers over a portion of their lengths, and the torsion bar 23 is housed within the hollow centers. As shown in FIG. 2, which is a cross-sectional view taken along Line I—I of FIG. 1, the input section 21 and the output section 22 overlap one another in the axial direction in the portion of the apparatus near where the torsion bar 23 is connected to the input section 21. In the overlapping region, the output section 22 substantially surrounds the input section 21. Gaps in the circumferential direction are provided between the input section 21 and the output section 22 in the overlapping region so that normally the two sections will not contact one another and torque will be transmitted from one to the other via the torsion bar 23. However, if the twisting of the torsion bar 23 due to the torque applied thereto exceeds a certain value, the input section 21 and the output section 22 will contact one another, and torque will be directly transmitted from the one to the other, preventing excessive torsional stresses from developing in the torsion bar 23.

The steering shaft 20 is rotatably supported by a steering column 30 which is secured to the chassis of an automobile. The steering column 30 comprises a cylindrical upper section 31, a cylindrical middle section 32, and a lower section 33. The upper section 31 is secured to the middle section 32 by screws 35, and the middle section 32 is press fit into the lower section 33, all three sections being coaxially disposed.

The upper section 31 has a ball bearing 36 secured to its inner periphery which journals the upper end of the input section 21 of the steering shaft 20. Similarly, the middle section 32 has a ball bearing 37 secured to its inner periphery which journals the bottom end of the input section 21 of the steering shaft 20, while the lower section 33 has a ball bearing 38 secured to its inner periphery which journals the output section 22. A retaining ring 39 is disposed in the middle section 32 adjacent to the ball bearing 37.

The lower section 33 of the steering column 30 has a generally cylindrical portion 33a which flares out into supports 33b at its bottom end. The supports 33b support an annular end plate 34 which is secured to the supports 33b by screws 77 in its outer periphery.

A sleeve 40 surrounds the output section 22 of the steering shaft 20 and is rotatably supported by ball bearings 41 and 42 which are secured to the cylindrical portion 33a of the lower section 33 and the end plate 34, respectively. The sleeve 40 is caused to rotate by a motor 60 through a speed reducing gear 50. The speed reducing gear 50 comprises a worm 51 which is secured to the output shaft 61 of the motor 60 and a worm wheel 52 which is mounted on the sleeve 40 so as to rotate therewith and which meshes with the worm 51.

The rotation of the sleeve 40 by the motor 60 is transmitted to the output section 22 of the steering shaft 20 by an electromagnetic clutch 70. Although a magnetic powder-type electromagnetic clutch may be used, in the present embodiment, a friction disk-type electromagnetic clutch is employed. The clutch 70 has a hub 71 which is mounted on the output section 22 so as to rotate therewith. An armature 72 is supported by the hub 71 with a tension spring 73 so as to be able to move in the axial direction of the output section 22. The armature 72 has an annular plate formed thereon, one face of which serves as a friction disk for the transmission of torque. A rotor 74 comprising inner and outer cylindrical walls connected by an annular plate at one end is press fit over the sleeve 40 so that the annular plate of the rotor 74 confronts the annular plate of the armature 72. A coil support bracket 75 supports an electromagnet coil 76 and is rigidly secured to the end plate 34 and to the lower section 33 of the steering column 30 in its outer periphery by the previously mentioned screws 77. The armature 72 of the clutch 70 is biased by the tension spring 73 so that normally it is pulled away from the rotor 74. However, when a current is passed through the electromagnet coil 76 in the appropriate direction, the armature 72 is drawn toward the rotor 74 until the confronting surfaces of the two firmly contact one another.

The motor 60 operates in response to the electrical output of a mechanism for detecting the application of torque to the steering wheel by a driver. Although there are no particular limitations on the type of torque detector which may be used, preferably it is of the type shown in FIG. 1 comprising a potentiometer 80 and a preamplifier 90. The potentiometer 80 is disposed around the torsion bar 23 near the end which is connected to the input section 21. The potentiometer 80 comprises a resistive element 81 having an annular shape which is secured to the inside surface of a cylindrical frame 82 which in turn is secured to the output section 22 by screws 83 so as to rotate therewith. The frame 82 is rotatably supported on the torsion bar 23 by ball bearings 84. A wiper arm 85 is rigidly mounted on a supporting ring comprising an electrically insulating ring 86 which is rigidly secured to the outer surface of the torsion bar 23 and an electrically conducting ring 87 which surrounds and is rigidly secured to the electrically insulating ring 86. The radially outer end of the wiper arm 85 is in sliding contact with the resistive element 81 so that the wiper arm 85 and the resistive element 81 can rotate with respect to one another while still maintaining electrical contact when the torsion bar 23 rotates with respect to the output section 22. It is also possible to structure the potentiometer 80 so that the resistive element 81 is mounted on the torsion bar 23 and the wiper arm 85 is mounted on the output section 22.

The preamplifier 90 is rigidly mounted on the output section 22 so as to rotate therewith and is electrically connected to the potentiometer 80 and to three slip rings 100a which are mounted in an electrically insulating support ring 100b which is rigidly secured to the outer surface of the output section 22. The slip rings 100a enable power to be supplied to the preamplifier 90 and enable its output to be removed to the outside of the steering column 30. As shown in FIG. 3, the preamplifier 90 has three input leads 91–93 and three output leads 94–96. The three output leads 94–96 are each electrically connected to one of the three slip rings 100a. Two of the input leads 91 and 93 are connected to opposite ends of the resistive element 81, while the other input lead 92 is electrically connected to the wiper arm 85 via an unillustrated brush which is in sliding electrical contact with the electrically conducting ring 87. The electrical output from the preamplifier 90 is transmitted to a stationary control unit 120 outside the steering column 30 via the slip rings 100a which are in sliding contact with three brushes 101 mounted in a brush holder 102 which is rigidly secured to the middle section 32 of the steering column 30.

At the upper end of the upper section 31 of the steering column 30 near the steering wheel 10 is provided a rotational speed measuring device 110 for measuring the rotational speed of the input section 21 of the steering shaft 20. The speed measuring device 110 comprises a sleeve 111 which is secured to the outer surface of the input section 21, a magnet 112 secured to the outer periphery of the sleeve 111, a coil 113 which surrounds the magnet 112, and a coil support sleeve 114 which fits over the end of the upper section 31 of the steering column 30 and supports the coil 113. When the input section 21 of the steering shaft 20 is rotated, the movement of the magnet 112 with respect to the coil 113 generates a voltage in the coil 113 which is output to the above-mentioned control unit 120, to which it is electrically connected.

FIG. 4 is a schematic diagram of a control system for the present embodiment. A control unit 120 is electrically connected to the coil 113 of the speed measuring device 110, to the slip rings 100a, to the electromagnet coil 76 of the clutch 70, and to the field and rotor coils of the motor 60. The control unit 120 controls the supply of current to the electromagnet coil 76 and to the motor 60 based on the output signals from the potentiometer 80 and the speed measuring device 110.

The operation of this apparatus is as follows. When a driver turns the steering wheel 10, the input section 21 of the steering shaft 20 will rotate with respect to the output section 22 and a torsional moment will be applied to the torsion bar 23, causing it to twist by a small angle. The twisting of the torsion bar 23 will cause the wiper arm 85 mounted on the torsion bar 23 to rotate with respect to the resistive element 81, changing the resistance between the input leads of the preamplifier 90 and changing the voltage at input lead 92. The voltage applied to input lead 92 is converted into a corresponding current by the preamplifier 90, and the converted current is output via the slip rings 100a to the control unit 120 as an input signal.

At the same time, an output voltage is input to the control unit 120 from the coil 113 of the speed measuring device 110 corresponding to the speed of rotation of the magnet 112 with respect to the stationary coil 113, and thus corresponding to the speed of rotation of the steering wheel 10.

When no torque is being applied to the steering shaft 20, no current flows through the electromagnet coil 76 of the clutch 70 and the clutch 70 is disengaged. However, when the control unit 120 determines that torque is being applied to the steering shaft 20 based on the output of the preamplifier 90, the control unit 120 energizes the electromagnet coil 76 and engages the clutch 70 so that the steering shaft 20 can be rotated by the motor 60 through the reduction gear 50. At the same time, the control unit 120 controls the rotor current of the motor 60 in accordance with the output of the preamplifier 90 so as to produce the necessary motor torque and it controls the field current in accordance with the output of the speed measuring device 110 so as to produce the necessary rotational speed. The rotation of the motor 60 is reduced in speed by the reduction gear 50 and transmitted to the output section 22 of the steering shaft 20 through the clutch 70. The output section 22 is thus rotated by the motor 60, reducing the force required by the driver to turn the steering wheel 10. The rotation of the steering shaft 20 causes the wheels of the vehicle to turn through a conventional wheel drive mechanism.

In the event that a magnetic powder-type electromagnetic clutch is employed instead of a friction disk-type electromagnetic clutch, the degree of control of torque transmission from the motor 60 to the steering shaft 20 can be increased, and it is possible to control the applied torque and speed of rotation of the steering shaft 20 by control of the clutch instead of by control of the rotor current and field current of the motor 60.

During normal operation, the motor 60 acts to rotate the output section 22 of the steering shaft 20 as soon as the rotation of the input section 21 is detected. Accordingly, the angle of twist of the torsion bar 23 is normally quite small and a large torque is not applied to it. However, if the motor 60 or other portion should fail so that the steering force must be applied entirely by hand, the angle of twist of the torsion bar 23 will increase. As the input section 21 and the output section 22 overlap one another as shown in FIG. 2, they will contact one another when the angle of twist reaches a certain value, and torque will be transmitted directly from the input section 21 to the output section 22. Therefore, there is no possibility of the torsion bar 23 being overstressed during manual operation.

Because a clutch 70 is provided between the output section 22 of the steering shaft 20 and the reduction gear 50, if the clutch 70 is disengaged, the steering shaft 20 can be rotated independently of both the reduction gear 50 and the motor 60. Accordingly, in the event that the motor 60 breaks or misfunctions and it is necessary to steer manually, the steering shaft 20 can be turned with no more force than is required for a manual steering apparatus.

Furthermore, by making the control unit 120 responsive to the speed of the vehicle, the operation of the motor 60 and the clutch 70 can be varied in accordance with the speed so that during normal operation at high speeds, the steering wheel 10 can be made to feel heavier to the driver than at low speed operation. This tends the driver from turning the steering wheel 10 too quickly at high speeds when sudden changes in direction are undesirable.

The use of a worm gear as a reduction gear 50 enables the reduction gear 50 to be extremely compact, and as the reduction gear 50 and the clutch 70 are coaxially disposed around the steering shaft 20, the entire apparatus is made compact with the only portion which is not coaxially disposed with respect to the steering shaft 20 being the motor 60.

What is claimed is:

1. A power steering apparatus comprising:
    a rotatably supported steering shaft having an input section adapted to be driven by a steering wheel, an output section adapted to drive a steering mechanism, a torsion bar connected between said input and output sections, and a positive engagement member on said input section engageable with said output section to drive said output section directly from said input section after a predetermined amount of rotation of said input section relative to said output section;
    an electric motor having a rotating output shaft;
    a driving reduction gear means secured to said output shaft and a meshing reduction gear means on said output section which meshes with said driving reduction gear means;
    an electromagnetic clutch which is connected between said output section and said meshing reduction gear means for transmitting the rotation of said motor through said meshing reduction gear means to said output section of said steering shaft when said clutch is engaged and which is rotatable independently of said driving reduction gear means and said motor when said clutch is disengaged; and
    control means for controlling said electromagnetic clutch and said motor for causing said electromagnetic clutch to engage and causing said motor to rotate when torque is applied to said steering shaft, whereby when said motor is not driven and said clutch is disengaged, said output section can be manually driven through said torsion bar up to the limit of relative rotation between said input and output sections and then can be manually driven through said positive engagement member.

2. A power steering apparatus as claimed in claim 1, wherein said electromagnetic clutch and said reduction gear means are coaxially disposed around said steering shaft.

3. A power steering apparatus as claimed in claim 2, wherein said electromagnetic clutch is a friction disk-type electromagnetic clutch.

4. A power steering apparatus as claimed in claim 2, wherein said electromagnetic clutch is a magnetic powder-type electromagnetic clutch.

5. A power steering apparatus as claimed in claim 3, wherein said control means comprises:
    torque detecting means for detecting when torque is applied to said steering shaft by a driver and producing a corresponding electrical output;

speed measuring means for measuring the rotational speed of said steering shaft and producing a corresponding electrical output; and means for controlling said motor and said electromagnetic clutch in response to the outputs of said torque detecting means and said speed measuring means.

6. A power steering apparatus as claimed in claim 5, wherein:

said torque detecting means comprises a potentiometer comprising an annular resistive element and a wiper arm which is in sliding electrical contact with said resistive element, one of which is secured to said output section and the other of which is secured to said torsion bar such that when said torsion bar is rotated with respect to said output section, said wiper arm will move with respect to said resistive element while maintaining electrical contact therewith; and said speed measuring means comprises a magnet and a coil, one of which is mounted on said input section so as to rotate therewith and the other of which is mounted on a stationary member such that when said input section is rotated, a voltage will be induced in said coil.

* * * * *